US006352778B1

(12) United States Patent
Gillette et al.

(10) Patent No.: US 6,352,778 B1
(45) Date of Patent: Mar. 5, 2002

(54) COATING COMPOSITIONS CONTAINING SILYLATED AROYLRESORCINOLS, METHOD, AND ARTICLES COATED THEREWITH

(75) Inventors: Gregory Ronald Gillette; Gautam Ambalal Patel, both of Clifton Park, NY (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 09/468,020

(22) Filed: Dec. 20, 1999

(51) Int. Cl.$^7$ ................................................ B32B 27/36
(52) U.S. Cl. ...................................................... 428/412
(58) Field of Search .......................................... 428/412

(56) References Cited

U.S. PATENT DOCUMENTS 4,552,936 A   11/1985   Moore ......................... 525/519
5,391,795 A   2/1995   Pickett ......................... 556/536
5,990,188 A   11/1999   Patel et al. ..................... 522/28

FOREIGN PATENT DOCUMENTS

EP          672732        9/1995

OTHER PUBLICATIONS

European Search Report for PCT International Application No. PCT/US 00/32280.

*Primary Examiner*—Terressa M. Boykin
(74) *Attorney, Agent, or Firm*—S. Bruce Brown; Noreen C. Johnson

(57) ABSTRACT

Thermoplastic articles such as polycarbonate sheet are protected against weathering by the application of a coating composition comprising at least one polymeric polyol, at least one alkanediol, at least one reactive aminoplast and at least one silylated substituted resorcinol such as 2-(3-triethoxysilylpropyl)4,6-dibenzoylresorcinol, usually in solution in a solvent. The coating composition may also contain a hindered amine light stabilizer.

36 Claims, No Drawings

COATING COMPOSITIONS CONTAINING SILYLATED AROYLRESORCINOLS, METHOD, AND ARTICLES COATED THEREWITH

BACKGROUND OF THE INVENTION

This invention relates to weatherable compositions, and more particularly to weatherable coating compositions for application to thermoplastic substrates.

It has long been conventional to apply protective coating compositions to abrasion-susceptible substrates such as polycarbonates and poly(methyl methacrylate) in sheet form, to improve their resistance to degradation of various kinds, including abrasion and degradation. Among the coating compositions employed for this purpose are those derived from a polymeric polyol, sometimes in combination with a low molecular weight diol, and an aminoplast.

Polymeric articles thus coated frequently have a problem of long term color instability. This causes yellowing of the polymeric substrate, detracting from its transparency and attractiveness. Loss of gloss can also be an undesirable long term phenomenon.

Yellowing of polymers is often caused by the action of ultraviolet radiation, which is why such yellowing is frequently designated "photoyellowing". It is particularly vexing when the polymeric article is to be used outdoors, in direct exposure to sunlight.

Numerous means for suppressing photoyellowing have been employed and proposed. Many of these involve incorporating in the coating composition an ultraviolet absorbing compound (UVA). Among the commercially available UVA's of particular interest are hydroxybenzophenones, hydroxyphenylbenzotriazoles, hydroxyphenyltriazines, cyanoacrylates and polyaroylresorcinols. It is frequently found, however, that these UVA's do not provide adequate protection against weathering.

A class of UVA's which has been found particularly useful in many environments for protection against weathering in outdoor exposure situations, is the silylated diaroylresorcinols disclosed in U.S. Pat. Nos. 5,391,795, 5,679,820 and 5,990,188. They are disclosed as being useful in and compatible with silicone hardcoat compositions and silicon-containing ultraviolet-cured coating compositions comprising acrylic monomers. Their use in polyol-aminoplast coating compositions is, however, not disclosed.

It is of interest, therefore, to develop protective coating compositions capable of improved protection of a substrate against weathering as evidenced by photoyellowing and the like.

SUMMARY OF THE INVENTION

The present invention is based on the discovery that silylated diaroylresorcinols are particularly effective as WVA's in polyol-aminoplast protective coating compositions, especially in combination with hindered amine light stabilizers (HALS).

In one of its aspects, the invention includes thermally curable compositions comprising the following and any uncured reaction products thereof:

(A) at least one polymeric polyol,
(B) at least one alkanediol,
(C) at least one reactive aminoplast and
(D) at least one silylated substituted resorcinol of the formula

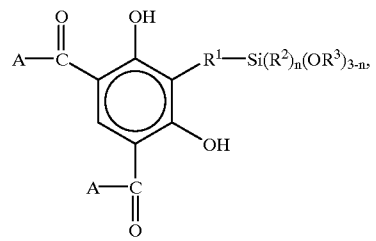

wherein:
each A is independently an unsubstituted or substituted aromatic radical,
$R^1$ is a divalent $C_{1-10}$ aliphatic hydrocarbon radical,
each $R^2$ and $R^3$ is independently a $C_{1-12}$ alkyl radical, and
n is 0–3.

In another aspect of the invention, said thermally curable compositions further contain at least one hindered amine light stabilizer.

Another aspect of the invention is a method for producing a cured coating on a thermoplastic substrate which comprises:

(I) coating said substrate with a thermally curable composition prepared by blending the constituents described above, and
(II) heating the coated substrate thus formed at a temperature effective to thermally cure said composition.

Still another aspect of the invention is coated resinous articles prepared by the above-described method.

DETAILED DESCRIPTION; PREFERRED EMBODIMENTS

It is immaterial from the standpoint of the invention, and not entirely certain in any event, whether any chemical reaction takes place between the various components as defined hereinafter, with the proviso that no curing reaction has taken place at the time the curable compositions are employed as coatings. Thus, the invention includes simple physical mixtures of said components and also uncured reaction products thereof.

Component A in the compositions of the invention is at least one polymeric polyol. By "polymeric polyol" is meant a polymer, usually of low to medium molecular weight (e.g., a number average molecular weight in the range of about 200–5,000), containing two or more hydroxy groups. For the most part, two hydroxy groups are present as end groups.

Various types of polymeric polyols are known in the art, and any of them may be used in the invention. Illustrations are polyether-, polyester-, polycarbonate- and polyurethane-polyols as well as the polycaprolactone-polyols disclosed in the aforementioned U.S. Pat. No. 4,552,936. The polyester-polyols are often preferred by reason of their particular suitability and relatively low cost. They may be illustrated by the "RUCOFLEX" hydroxy-terminated polyesters of Ruco Chemical Company, which are generally prepared by the reaction of at least one aliphatic diol, or mixture thereof with at least one triol and/or polyhydroxy compound of higher functionality, with at least one aliphatic and/or aromatic dicarboxylic acid or functional derivative thereof. Examples of diols are ethylene glycol, diethylene glycol, propylene glycol, 1,4-butanediol, 1,6-hexanediol, 2-methyl-1,3-propanediol and 2,2-dimethyl-1,3-propanediol; higher polyols include 1,1,1-tris(hydroxymethyl)propane and glycerol. Examples of dicarboxylic acids are adipic acid, succinic anhydride, 1,12-dodecanedioic acid, phthalic anhydride, isophthalic acid and terephthalic acid. Most preferred in many instances are polyester-polyols prepared from adipic acid and a mixture of 1,6-hexanediol and 2,2-dimethyl-1,3-propanediol, as illustrated by the product sold under the trade name "RUCOFLEX S-1015".

Component B is at least one alkanediol, preferably containing about 1–6 carbon atoms. Illustrative alkanediols are ethylene glycol, propylene glycol, 1,3-propanediol, 1,4-butanediol, 1,6-hexanediol and 2,2-dimethyl-1,3-propanediol. 1,4-Butanediol is usually preferred.

Component C is at least one reactive aminoplast. As used herein, the term "aminoplast" means a thermosetting amine-aldehyde or amide-aldehyde condensation product, which may be monomeric or polymeric. Exemplary of the aminoplast compositions that may be employed are the urea formaldehydes, e.g., propylene urea formaldehyde and dimethylol urea formaldehyde; melamine formaldehydes, e.g., tetramethylolmelamine, pentamethylolmelamine and hexamethylolmelamine; ethylene ureas, e.g., dimethylol ethylene urea, dihydroxydimethylol ethylene urea, ethylene urea formaldehyde and hydroxyethylene urea formaldehyde; carbamates, e.g., alkyl carbamate formaldehydes; formaldehyde-acrolein condensation products; formaldehyde-acetone condensation products; alkylolamides, e.g., N-methylolformamide, N-methylolacetamide, N-methylolacrylamide, N-methylolmethacrylamide, N-methylol-N-methylacrylamide and N-methylol methylene bis (acrylamide); haloethyleneacrylamide; diureas, e.g., trimethylol acetylene diurea and tetramethylol acetylene diurea; triazones, e.g., dimethylol-N-ethyl triazone, N,N'-thylenebis (dimethylol)triazone and halo triazones; haloacetamides, e.g. N-methylol-N-methylchloroacetamide; and urons, e.g., dimethylol uron and dihydroxy dimethylol uron. Also useful, and often preferred, are derivatives of the above compounds wherein the methylol or other hydroxyalkyl groups therein are replaced by lower alkoxyalkyl groups (e.g., hexamethoxymethylmelamine), as well as analogous thioureas, thioamides and the like. Particularly preferred are the melamine derivatives and especially hexamethoxymethylmelamine, which is commercially available from Cytec Industries under the trade name "CYMEL 301".

Component D, the silylated substituted resorcinol, has formula I in which the A value may be any unsubstituted or substituted aromatic radical, illustrations being phenyl, p-chlorophenyl, p-tolyl, 1-naphthyl and 2-naphthyl; phenyl is generally preferred. The $R^1$ radical may be, for example, ethylene, trimethylene, tetramethylene, propylene or neopentylene; trimethylene is preferred. The value of n may be from 0 to 3 and is usually 0. Both $R^2$ and $R^3$ may be, for example, methyl, ethyl, 1-propyl, 2-propyl, 1-butyl, 2-methyl-1-propyl, 1-pentyl, 1-octyl, 2-ethylhexyl, 1-decyl or 1-dodecyl, with methyl and ethyl generally being preferred. Preferred compounds of formula I are 2-(3-trialkoxysilylalkyl)-4,6-diaroylresorcinols. The most preferred compound of formula I is 2-(3-triethoxysilylpropyl)-4,6-dibenzoylresorcinol.

The compositions of this invention may contain additional constituents including solvents, curing catalysts, stabilizers, flow modifiers and surfactants. The purpose of the solvent is to facilitate blending and application of the coating composition. Catalysts accelerate curing, and stabilizers serve to reduce activity of the catalysts during storage and before curing is desired.

Suitable solvents include alcohols, ketones, esters, ethers, alkoxy alkanols, halogenated compounds, carboxylic acids and aromatic compounds. They may be used singly or in combination. Particularly suitable solvents are lower alkanols (e.g. methanol, ethanol, propanol and butanol) and alkoxyalkanols as illustrated by ethylene glycol ethers such as the monomethyl, monoethyl and mono-n-butyl ethers, the latter being preferred.

Catalysts include alkyl acid phosphates such as methyl dihydrogen phosphate, ethyl dihydrogen phosphate, propyl dihydrogen phosphate, n-butyl dihydrogen phosphate and di-n-butyl monohydrogen phosphate; phosphoric acid; dicarboxylic acids and their functional derivatives such as maleic acid and anhydride, fumaric acid and chloromaleic acid and anhydride; alkyl hydrogen phthalates such as methyl, ethyl, propyl and butyl hydrogen phthalate; monoalkyl succinates and maleates such as methyl, ethyl, propyl and butyl hydrogen succinates and maleates; and the sulfonic acids and derivatives thereof including p-toluenesulfonic acid and methanesulfonic acid. p-Toluenesulfonic acid is often preferred.

Coating compositions which are to be prepared in advance of or stored prior to application and cure require stabilizers to deactivate the catalyst until cure. It is within the skill of the art to determine suitable stabilizers for use with a given catalyst. For the catalysts previously mentioned including the preferred p-toluenesulfonic acid, amines such as methylaminoethanol, triethylamine and 2-amino-2-methyl-1-propanol may be employed, with triethylamine often being preferred.

It is also often preferred to incorporate a hindered amine light stabilizer (HALS) in the compositions of the invention, since the presence of a HALS can decrease the hazing tendency of said compositions. HALS compounds are known in the art and are generally derivatives of 2,2,6,6-tetramethylpiperidines. Examples are 4-methacryloxy-2,2,6,6-tetramethylpiperidine, 4-methacryloxy-2,2,6,6-tetramethyl-N-methylpiperidine, 3-dodecyl-1-(2,2,6,6-tetramethyl-4-piperidino)-2,5-pyrrolidinedione, 3-dodecyl-1-(2,2,6,6-tetramethyl-N-methyl-4-piperidino)-2,5-pyrrolidinedione, 3-dodecyl-1-(2,2,6,6-tetramethyl-N-acetyl-4-piperidino)-2,5-pyrrolidinedione, copolymers of 4-methacryloxy-2,2,6,6-tetramethylpiperidine with methyl methacrylate, homopolymers of 4-methacryloxy-2,2,6,6-tetramethylpiperidine, and the compound having the formula

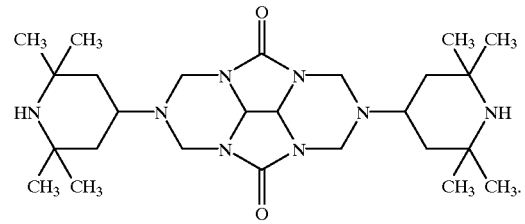

Flow modifying additives useful in the compositions of the invention include cellulose esters. Surfactants include various art-recognized silicone compounds.

Weight ratios of component B to component A in the compositions of the invention are most often in the range of about 0.2–1.0:1 and preferably about 0.5–0.9:1. The weight ratio of component C to component A in the range of about 0.5–2.5:1, and preferably about 0.8–1.4:1. Component D and the HALS, when employed, are present in amounts effective to afford protection against ultraviolet degradation, most often about 1–12 parts and preferably about 4–9 parts (by weight) of component D and about 0.1–2.0 parts and preferably about 0.5–1.5 parts of HALS per 100 parts of non-volatile constituents (phr). Other constituents, including catalysts, stabilizers, flow modifiers and surfactants, may be present in minor proportions known to those skilled in the art. Solvent is usually incorporated in an amount to provide a non-volatiles content (i.e., a content of all constituents except solvent) in the range of about 15–80% by weight.

The coating compositions of the invention may be prepared by simply blending the constituents thereof, typically at temperatures in the range of about 10–35° C. They may be applied to substrates by any art-recognized coating method, including brushing, spraying, flow coating, dip coating, drawing down and coextrusion. Following application of the coating composition, any solvent present therein is removed and curing is effected by heating, typically in contact with air and to a temperature in the range of about 100–150° C.

The substrates present in the coated articles of this invention are often preferably sheet materials and may be of any suitable thermoplastic material. Examples are polycarbonates, polyesters, polyamides, polyimides and addition polymers including acrylic polymers and polystyrenes (e.g., acrylonitrile-styrene, acrylonitrile-butadiene-styrene and acrylonitrile-styrene-alkyl acrylate copolymers), polyvinyl chloride, polyethylene and polypropylene. Polycarbonates are often preferred, with bisphenol A polycarbonates being most preferred; i.e., polycarbonates derived from 2,2-bis(4-hydroxyphenyl)propane ("bisphenol A").

The invention is illustrated by the following examples. All parts are by weight.

EXAMPLES 1–3

A base coating composition was prepared by blending the following constituents at ambient temperature:

Component A: RUCOFLEX S-1015 1,6-hexanedioli/2,2-dimethyl-1,3-propanediol adipate polyol, 18.4 parts;

Component B: 1,4-butanediol, 16.5 parts;

Component C: CYMEL 301 hexamethoxymethylmelane, 24.5 parts;

Solvent: ethylene glycol mono-n-butyl ether, 40 parts;

Catalyst: p-toluenesulfonic acid (as 40% solution in 2-propanol), 0.44 part;

Stabilizer: triethylamine, 0.08 part;

Flow modifier: cellulose acetate butyrate, 0.5 part;

Silicone surfactant, 0.02 part.

The base coating composition was divided into several aliquots to which were added various UVA's including 2-(3-triethoxysilylpropyl)-4,6-dibenzoylresorcinol (SDBR) and, in Example 3, the HAMS 3-dodecyl-1-(2,2,6,6-tetramethyl-N-acetyl-4 piperidino)-2,5-pyrrolidinedione. The resulting solutions were applied by flow coating to bisphenol A polycarbonate plaques, air dried for 10 minutes and cured for 90 minutes at 130° C. in an air circulated convection oven. All cured coatings (examples and controls) were optically clear and defect-free, and had thicknesses in the range of 8–12 microns.

The coated panels were weathered in cycles in a QUV® accelerated weatherometer (Q-Panel Co.) and evaluated periodically for percent haze and yellowness index (YI), as well as visually for such defects as cracking and delamination demonstrating loss of adhesion. The weathering conditions were UV-B 313 (FS-40) lamps; 8 hours UV light at 70° C. followed by 4 hours moisture condensation in dark at 50° C. Times required to produce a haze value of 10% or greater and a YI of 5 or greater were recorded, as well as the haze value after 100 cycles. The results are given in the following table, in comparison with four controls employing commercially available benzophenone, benzotriazole and hydroxyphenyltriazine UVA's.

| Example | UVA (phr) | HALS, phr | Haze > 10%, hrs | YI > 5, hrs | Haze, 100 cycles, % |
|---|---|---|---|---|---|
| 1 | SDBR (4) | — | 4,500 | 4,800 | 8.3 |
| 2 | SDBR (8) | — | >8,100 | >8,100 | 9.3 |
| 3 | SDBR (8) | 1 | >8,100 | >8,100 | 8.1 |
| Control 1 | Benzophenone (4) | — | 1,600 | 1,300 | 8.5 |
| Control 2 | Benzotriazole (4) | — | 1,300; delamination | 150 | 9.3 |
| Control 3 | Hydroxyphenyltriazine (4) | — | 4,500 | 4,000 | 8.8 |
| Control 4 | Hydroxyphenyltriazine (8) | — | 5,500 | 5,900 | 12.2 |

It can be seen from the table that the compositions of this invention have weatherability equivalent or superior to the controls, as demonstrated by the times required to attain the targeted levels of haze and yellowness. This is particularly true at levels of 8 phr. Haze values (Taber abrasion test, ASTM D1044, CS-10F wheels) at 100 cycles are also superior or at least equivalent. Comparing Example 1 with Control 3, the closest in terms of properties, it is apparent that the composition of the invention is superior in YI and at worst equivalent in haze.

While typical embodiments have been set forth for the purpose of illustration, the foregoing descriptions and examples should not be deemed to be a limitation on the scope of the invention. Accordingly, various modifications, adaptations, and alternatives may occur to one skilled in the art without departing from the spirit and scope of the present invention.

What is claimed is:

1. A thermally curable composition comprising the following and any uncured reaction products thereof:

(A) at least one polymeric polyol, (B) at least one alkanediol, (C) at least one reactive aminoplast and (D) at least one silylated substituted resorcinol of the formula

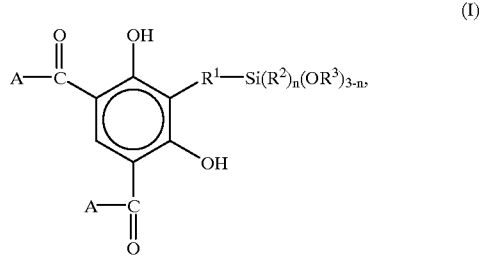

(I)

wherein:
each A is independently an unsubstituted or substituted aromatic radical,
$R^1$ is a divalent $C_{1-10}$ aliphatic hydrocarbon radical,
each $R^2$ and $R^3$ is independently a $C_{1-12}$ alkyl radical, and
n is 0–3.

2. The composition according to claim 1 further comprising a solvent.

3. The composition according to claim 2 wherein component A is a polyether-, polyester-, polycarbonate-, polyurethane- or polycaprolactone-polyol.

4. The composition according to claim 3 wherein component A is a polyester-polyol.

5. The composition according to claim 2 wherein component B contains about 1–6 carbon atoms.

6. The composition according to claim 5 wherein component B is 1,4-butanediol.

7. The composition according to claim 2 wherein component C is a melamine derivative.

8. The composition according to claim 7 wherein component C is hexamethoxymethylmelamine.

9. The composition according to claim 2 wherein component D is 2-(3-triethoxysilylpropyl)-4,6-dibenzoylresorcinol.

10. The composition according to claim 2 wherein the solvent is a lower alkanol or an alkoxyalkanol.

11. The composition according to claim 10 wherein the solvent is ethylene glycol mono-n-butyl ether.

12. The composition according to claim 2 further comprising a catalyst.

13. The composition according to claim 12 wherein the catalyst is p-toluenesulfonic acid.

14. The composition according to claim 12 further comprising a stabilizer.

15. The composition according to claim 14 wherein the stabilizer is triethylamine.

16. The composition according to claim 2 further comprising a hindered amine light stabilizer.

17. The composition according to claim 16 wherein the hindered amine light stabilizer is at least one compound selected from the group consisting of 4-methacryloxy-2,2,6,6-tetramethylpiperidine, 4-methacryloxy-2,2,6,6-tetramethyl-N-methylpiperidine, 3-dodecyl-1-(2,2,6,6-tetramethyl-4-piperidino)-2,5-pyrrolidinedione, 3-dodecyl-1-(2,2,6,6-tetramethyl-N-methyl-4-piperidino)-2,5-pyrrolidinedione, 3-dodecyl-1-(2,2,6,6-tetramethyl-N-acetyl-4piperidino)-2,5-pyrrolidinedione, copolymers of 4methacryloxy-2,2,6,6-tetramethylpiperidine with methyl methacrylate, homopolymers of 4-methacryloxy-2,2,6,6-tetramethylpiperidine, and the compound having the formula

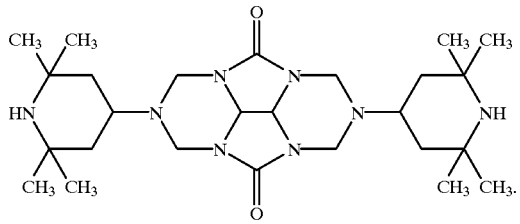

18. A thermally curable composition comprising the following and any uncured reaction products thereof:
(A) at least one polyester polyol,
(B) at least one alkanediol containing 1–6 carbon atoms,
(C) at least one reactive melamine derivative and
(D) at least one silylated substituted resorcinol of the formula

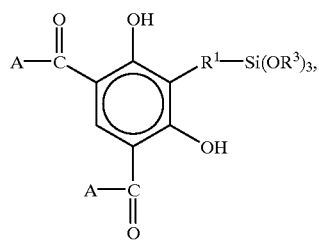

(I)

wherein:
each A is independently an unsubstituted or substituted aromatic radical,
$R^1$ is a divalent $C_{1-10}$ aliphatic hydrocarbon radical, and
each $R^3$ is independently a $C_{1-12}$ alkyl radical.

19. A thermally curable composition comprising the following and any uncured reaction products thereof:
(A) a polyester-polyol,
(B) butanediol,
(C) hexamethoxymethylmelamine, and
(D) 2-(3-triethoxysilylpropyl)-,4,6-dibenzoylresorcinol,
wherein the weight ratio of component B to component A is in the range of 0.2–1.0:1, the weight ratio of component C to component A is in the range of about 0.5–2.5:1, and component D is present in about 1–10 parts by weight per 100 parts of non-volatile constituents.

20. A method for producing a cured coating on a thermoplastic substrate which comprises:
(I) coating said substrate with a thermally curable composition prepared by blending:
(A) at least one polymeric polyol,
(B) at least one alkanediol,
(C) at least one reactive aminoplast and
(D) at least one silylated substituted resorcinol of the formula

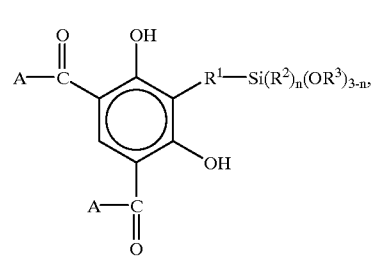

(I)

wherein:
each A is independently an unsubstituted or substituted aromatic radical,
$R^1$ is a divalent $C_{1-10}$ aliphatic hydrocarbon radical,
each $^2$ and $R^3$ is independently a $C_{1-12}$ alkyl radical, and
n is 0–3; and
(II) heating the coated substrate thus formed at a temperature effective to thermally cure said composition.

21. The method according to claim 20 wherein the substrate is a polycarbonate.

22. The method according to claim 20 wherein component A is a polyether-, polyester-, polycarbonate-, polyurethane- or polycaprolactone-polyol.

23. The method according to claim 20 wherein component B contains about 1–6 carbon atoms.

24. The method according to claim 20 wherein component C is hexamethoxymethylmelamine.

25. The method according to claim 20 wherein component D is 2-(3-triethoxysilylpropyl)-4,6-dibenzoylresorcinol.

26. The method according to claim 20 wherein the thermally curable composition further comprises a catalyst and a stabilizer.

27. The method according to claim 20 wherein the thermally curable composition further comprises a hindered amine light stabilizer.

28. A method for producing a cured coating on a polycarbonate substrate which comprises:
(I) coating said substrate with a thermally curable composition prepared by blending:
(A) a polyester-polyol,
(B) butanediol,
(C) hexamethoxymethylmelarnine, and
(D) 2-(3-triethoxysilylpropyl)-4,6-dibenzoylresorcinol,
wherein the weight ratio of component B to component A is in the range of 0.2–1.0:1, the weight ratio of component C to component A is in the range of about 0.5–2.5:1, and component D is present in about 1–10 parts by weight per 100 parts of non-volatile constituents; and
(II) heating the coated substrate thus formed at a temperature effective to thermally cure said composition.

29. A resinous article prepared by the method of claim 20.
30. A resinous article prepared by the method of claim 21.
31. A resinous article prepared by the method of claim 22.
32. A resinous article prepared by the method of claim 23.
33. A resinous article prepared by the method of claim 24.
34. A resinous article prepared by the method of claim 25.
35. A resinous article prepared by the method of claim 27.
36. A resinous article prepared by the method of claim 28.

* * * * *